L. LAISNE.
AUTOMOBILE FRAME.
APPLICATION FILED APR. 30, 1914. RENEWED NOV. 20, 1917.
1,264,094.
Patented Apr. 23, 1918.
2 SHEETS—SHEET 1.
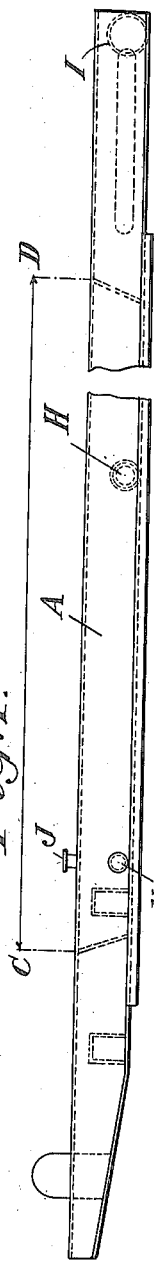
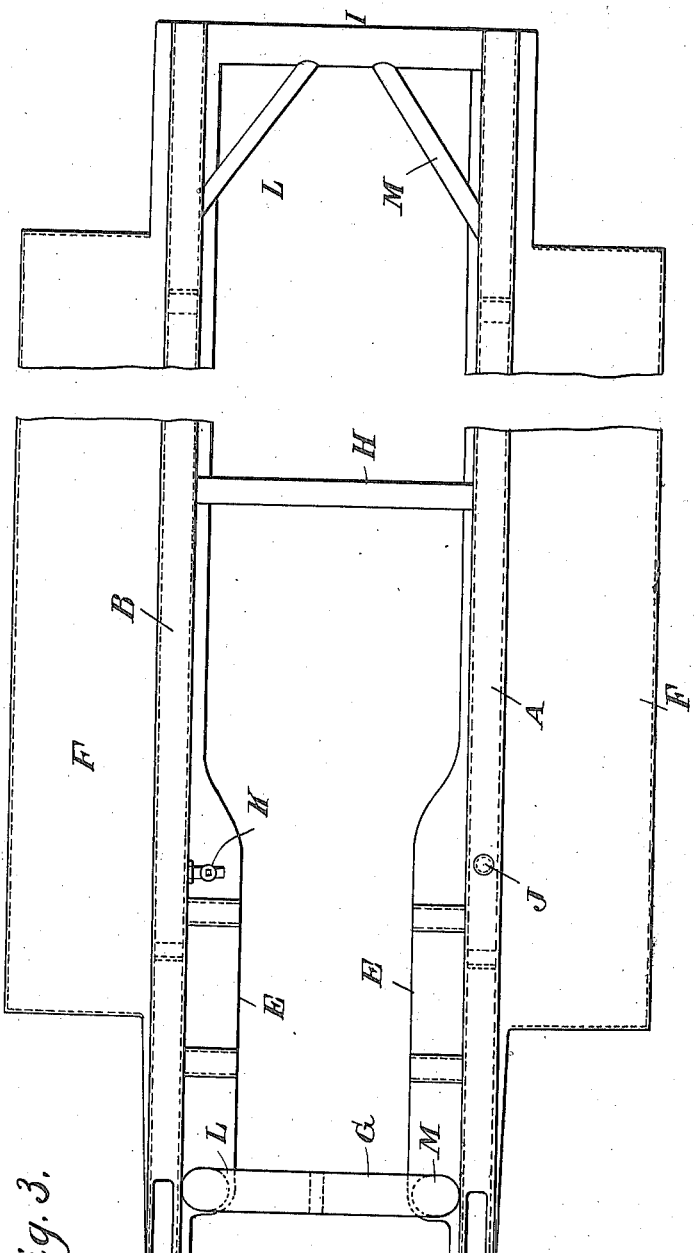
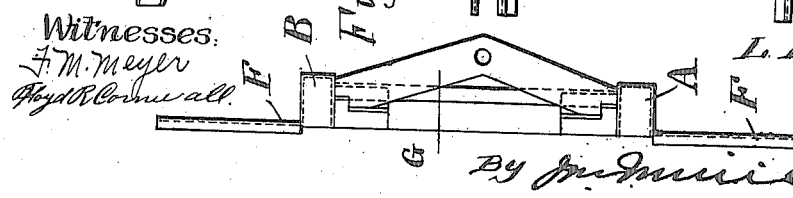

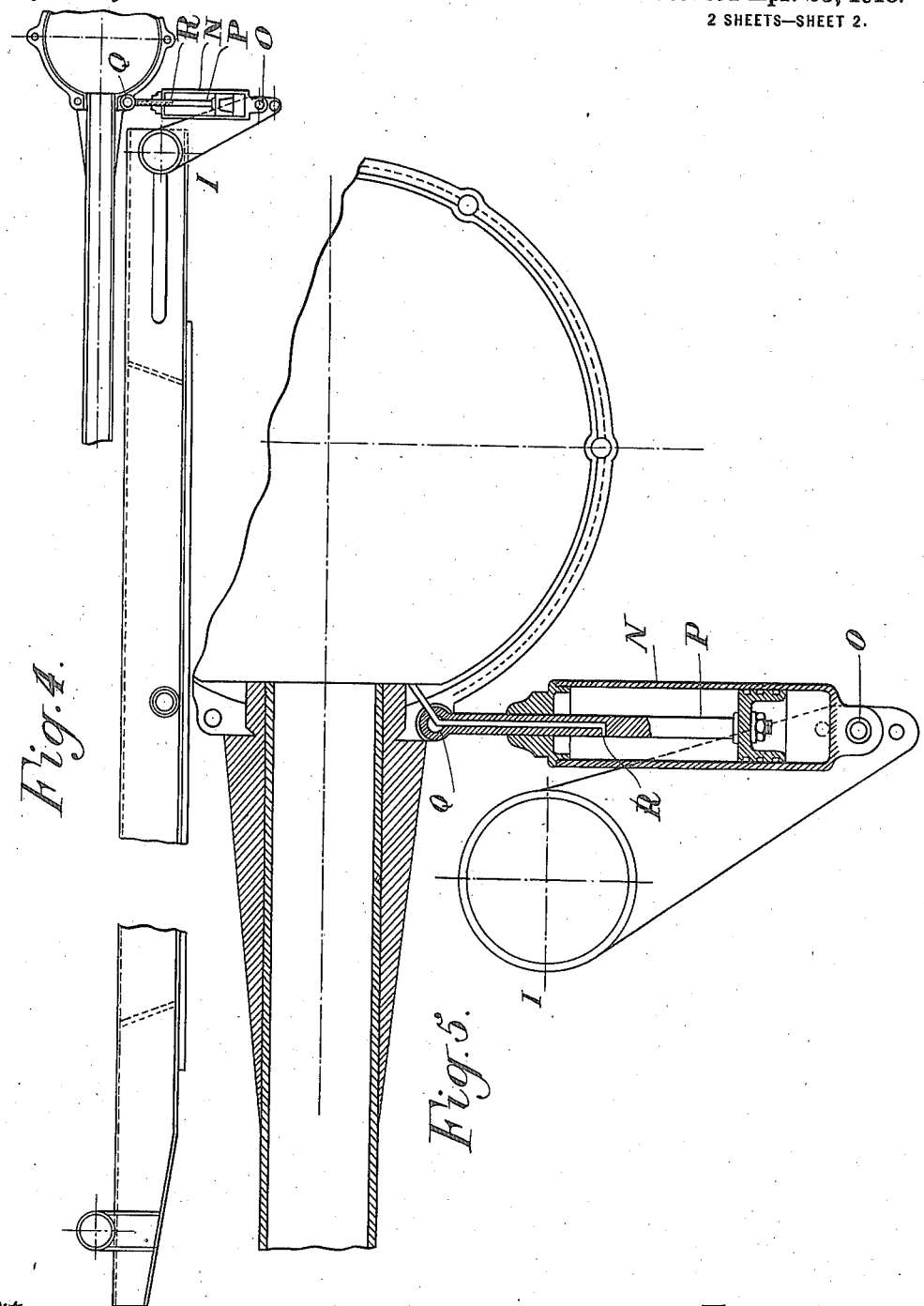

UNITED STATES PATENT OFFICE.

LÉON LAISNE, OF DOUAI, FRANCE.

AUTOMOBILE-FRAME.

1,264,094.

Specification of Letters Patent.   Patented Apr. 23, 1918.

Application filed April 30, 1914, Serial No. 835,455.   Renewed November 20, 1917.   Serial No. 203,000½.

*To all whom it may concern:*

Be it known that I, LÉON LAISNE, a citizen of the French Republic, and resident of Douai, France, have invented certain new and useful Improvements in Automobile and the like Frames, of which the following is a specification.

The present invention relates to an automobile or the like frame in which the longitudinal bearers or frame members form the fuel tank while the cross bearers form reservoirs for compressed air, the foot boards being integral with the longitudinal bearers so that any connecting means between said parts are dispensed with. Furthermore the body of an air pump is secured to the frame while the piston is mounted on the axles, in such a manner that the motions of the piston within the pump body, produced by the irregularities of the road, compress air in the cross bearer forming the compressed air reservoir. Owing to such arrangement, the number of parts of the automobile is diminished, the frame is stronger and a very simple shock deadening device is provided. In effect, when a shock is imparted to the axle, and the latter tends to move away from the frame, the piston is moving upward and sucks air, after which the frame moves back into its normal position. At this instant the piston is moving downward, expelling the air which is forced into the reservoir. For forcing the sucked air into the reservoir, a resistance acts onto the piston, which resistance prevents the frame from being pushed suddenly into its initial position, so that the air pump forms a positive shock deadening device.

The invention is shown in the accompanying drawings, in which:

Figure 1 is a lateral view of an automobile frame.

Fig. 2 is a top view corresponding to Fig. 1.

Fig. 3 is a front view of same.

Fig. 4 is a lateral view of the frame and rear axle showing the arrangement of the air pump on both said parts.

Fig. 5 is a sectional view of the pump showing the automatic lubricating device of same.

The longitudinal bearers A and B are formed by means of rectangular or the like boxes. The portion C D of each of said boxes is tightly closed and forms the fuel tank. Said bearers are provided with extensions E supporting the driving organs and with outer boards F forming the foot boards.

The longitudinal bearers A, B are connected by means of tubular cross bars G. H. I.

The cross bars G and I form reservoirs for the compressed air while the intermediate cross bar H forms a tube connecting both fuel reservoirs A and B.

J is an aperture at the top of one of the longitudinal bearers and through which the fuel is poured into the reservoir, while K is an outlet for evacuating the fuel.

An air inlet L and an air outlet M are provided on the cross bearers I and G forming the air tank.

The pump body N is secured on the frame by means of a bolt O around which said body pivots.

The piston rod P is secured to the back axle by means of a bolt Q. The latter is provided with a lubricating bore opening into the interior of the back axle. The oil contained in the latter is thrown into the lubricating hole and flows through the bore Q and through a bore R of the piston rod for automatically lubricating the piston rod and the piston.

Having now fully described my said invention what I claim and desire to secure by Letters Patent, is:

1. A motor vehicle frame including longitudinal members, said members being hollow and closed at each end, a plurality of partitions in said members, forming front, rear and intermediate sets of compartments, front and rear transverse frame members for holding together the longitudinal members, said transverse members being hollow, and an intermediate transverse hollow frame member, the transverse members being adapted to form conduits between oppositely disposed sets of the compartments in the longitudinal members.

2. A motor vehicle including longitudinal tubular frame members, rectangular in cross section and closed at each end, said frame members being partitioned within to form a front, rear and intermediate series of compartments, a tubular front frame member disposed transversely of the frame and adapted to form a passage between the front series of compartments, a tubular rear member adapted to form a passage between the rear series of compartments, and an intermediate duct for connecting the intermediate series of compartments.

In testimony whereof I have hereunto set my hand in presence of two witnesses.

LÉON LAISNE.

Witnesses:
F. VERHAYES,
ALFRED C. HARRISON.